(12) United States Patent
Griffioen

(10) Patent No.: US 11,196,237 B2
(45) Date of Patent: Dec. 7, 2021

(54) APPARATUS AND METHOD FOR JETTING A CABLE INTO A DUCT

(71) Applicant: PLUMETTAZ HOLDING S.A., Bex (CH)

(72) Inventor: Willem Griffioen, Ter Aar (NL)

(73) Assignee: Plumettaz Holding S.A., Bex (CH)

( * ) Notice: Subject to any disclaimer, the term of this patent is extended or adjusted under 35 U.S.C. 154(b) by 396 days.

(21) Appl. No.: 16/323,196

(22) PCT Filed: Aug. 3, 2017

(86) PCT No.: PCT/EP2017/069721
§ 371 (c)(1),
(2) Date: Feb. 4, 2019

(87) PCT Pub. No.: WO2018/024846
PCT Pub. Date: Feb. 8, 2018

(65) Prior Publication Data
US 2019/0165554 A1 May 30, 2019

(30) Foreign Application Priority Data
Aug. 4, 2016 (CH) ..................................... 01006/16

(51) Int. Cl.
*H02G 1/08* (2006.01)
(52) U.S. Cl.
CPC .................................. *H02G 1/086* (2013.01)
(58) Field of Classification Search
CPC ........ H02G 1/08; H02G 1/086; G02B 6/4464; E21B 23/08
USPC ........................ 254/134.3 R, 134.3 FT, 134.4
See application file for complete search history.

(56) References Cited

U.S. PATENT DOCUMENTS

| | | | |
|---|---|---|---|
| 3,006,607 A | 10/1961 | Hamrick |
| 3,034,766 A | 5/1962 | Hamrick |
| 3,374,535 A | 3/1968 | Tranel |
| 4,185,809 A | 1/1980 | Jonnes |
| 4,202,531 A | 5/1980 | Hamrick |
| 5,156,376 A | 10/1992 | Spicer |
| 5,197,715 A | 3/1993 | Griffioen |
| 5,474,277 A | 12/1995 | Griffioen |

(Continued)

FOREIGN PATENT DOCUMENTS

DE 29505241 U1 7/1996
EP 0162543 A2 11/1985
(Continued)

OTHER PUBLICATIONS

Application and File history for U.S. Appl. No. 15/111,522, filed Jul. 14, 2016. Inventors: Griffioen et al.
(Continued)

*Primary Examiner* — Lee D Wilson
*Assistant Examiner* — Alberto Saenz
(74) *Attorney, Agent, or Firm* — Patterson Thuente Pedersen, P.A.

(57) ABSTRACT

A method for installing an elongated element into a duct by pushing the elongated element into the duct through a pressure chamber, introducing pressurized fluid into the duct at a nominal pressure, and applying a driving force. The method including monitoring fluid pressure into the duct and the driving force and reducing the fluid pressure to a predetermined value lower than the nominal pressure.

22 Claims, 3 Drawing Sheets

(56) References Cited

U.S. PATENT DOCUMENTS

| | | | |
|---|---|---|---|
| 5,699,996 A | 12/1997 | Boyle et al. | |
| 5,762,321 A | 6/1998 | Petersen et al. | |
| 5,813,658 A | 9/1998 | Kaminski et al. | |
| 5,884,384 A | 3/1999 | Griffioen | |
| 5,897,103 A | 4/1999 | Griffioen et al. | |
| 6,012,621 A | 1/2000 | Hoium et al. | |
| 6,059,264 A * | 5/2000 | Kaminski | B65H 51/14 254/134.3 FT |
| 6,264,171 B1 * | 7/2001 | Hoium | G02B 6/4463 226/35 |
| 6,315,498 B1 | 11/2001 | Baugh et al. | |
| 6,382,875 B1 | 5/2002 | Plumettaz | |
| 6,402,123 B1 * | 6/2002 | Rivard | G02B 6/4464 254/134.4 |
| 6,540,208 B1 * | 4/2003 | Pecot | G02B 6/4463 254/134.3 R |
| 6,631,884 B2 * | 10/2003 | Griffioen | G02B 6/4464 254/134.3 R |
| 7,322,421 B2 | 1/2008 | Blacklaw | |
| 8,770,550 B2 | 7/2014 | Plumettaz et al. | |
| 9,287,689 B2 | 3/2016 | Plumettaz et al. | |
| 10,305,266 B2 | 5/2019 | Griffioen | |
| 2003/0136952 A1 | 7/2003 | Pecot et al. | |
| 2005/0013598 A1 | 1/2005 | Kim | |
| 2005/0274576 A1 | 12/2005 | Coder | |
| 2006/0219992 A1 * | 10/2006 | Fee | H02G 1/086 254/134.4 |
| 2006/0284148 A1 | 12/2006 | Watkins | |
| 2012/0267590 A1 | 10/2012 | Plumettaz et al. | |
| 2013/0299758 A1 | 11/2013 | Griffioen | |
| 2014/0265322 A1 | 9/2014 | Thompson | |
| 2015/0268437 A1 * | 9/2015 | Chen | G02B 6/4438 254/134.4 |
| 2015/0276096 A1 | 10/2015 | Chen | |
| 2015/0316041 A1 | 11/2015 | Chen | |
| 2020/0150375 A1 | 5/2020 | Wacinski | |

FOREIGN PATENT DOCUMENTS

| | | |
|---|---|---|
| EP | 0442626 A2 | 8/1991 |
| EP | 0445858 A1 | 9/1991 |
| EP | 0467463 A1 | 1/1992 |
| EP | 1832908 A1 | 9/2007 |
| EP | 2031719 A1 | 3/2009 |
| EP | 2031719 B1 | 1/2013 |
| JP | H09113778 A | 5/1997 |
| JP | H09113779 | 5/1997 |
| WO | WO-2005018067 A1 | 2/2005 |
| WO | WO-2007034242 A1 | 3/2007 |
| WO | WO2007113519 | 10/2007 |
| WO | WO2007117244 | 10/2007 |
| WO | WO2010112852 | 10/2010 |
| WO | WO2013057283 | 4/2013 |

OTHER PUBLICATIONS

Office Action dated Dec. 16, 2020 for Japanese Application No. 2019-0532812, 8 pages.

International Search Report and Written Opinion for International Application No. PCT/EP2015/053293 dated Apr. 17, 2015, 8 pages.

International Search Report and Written Opinion for International Application No. PCT/EP2018/052699 dated May 8, 2018, 9 pages.

Switzerland Search Report for Application No. CH00206/14 dated May 8, 2014, 4 pages. (English translation not provided).

Switzerland Search Report for Application No. CH00125/17 dated Mar. 3, 2017, 2 pages.

International Search Report and Written Opinion for PCT/FP2017/069721 dated Oct. 20, 2017.

Griffioen, "Understanding of Cable in Duct Installation: Do's and Don'ts", Switzerland. *Proceedings of the 60$^{th}$ IWCS Conference.* Nov. 1, 2011.

Switzerland Search Report for Switzerland Application No. CH01006/16 dated Oct. 18, 2016.

* cited by examiner

APPARATUS AND METHOD FOR JETTING A CABLE INTO A DUCT

RELATED APPLICATIONS

The present application is a National Phase entry of PCT Application No. PCT/EP2017/069721, filed Aug. 3, 2017, which claims priority to CH 01006/16, filed Aug. 4, 2016, the contents of each being incorporated herein by reference in their entireties.

TECHNICAL FIELD

The present invention relates to a method to lay or install a cable or a fiber into a duct with the assistance of driving means and fluid drag until it reaches its final position.

BACKGROUND

"Jetting" a cable refers to the laying of a fiber or a cable, referred hereafter as an "elongated element", into a duct with the assistance of driving means to push the elongated element into the duct and of an air flow created in the duct to create a drag force along the introduced elongated element.

"floating" a cable refers to the laying of a fiber or a cable, referred hereafter as an "elongated element", into a duct with the assistance of driving means to push the elongated element into the duct and of a flow of liquid created in the duct to create a drag force along the introduced elongated element, with a compensation of weight due to liquid's density.

Document EP2415135 A2 describes a blowing head for jetting a cable into a duct. However, this document does not give any hint to increase the maximum length of the elongated element achievable with such method. It is for example not recognized how a wrong balance between fluid pressure and pushing force has a negative impact on the maximum achievable length and how to improve this balance. Typically, when such maximum length is achieved before the elongated element has reached its final position in the duct, the distal end of the elongated element stops, while the elongated element is still pushed into the pressurized duct, thereby leading to undulations, or even tangling and/or buckling of the elongated element into the duct. It has to be noted that the situation is most critical when very flexible fibers are laid into a duct, as such undulations/tangling/buckling may appear very rapidly, and damage the fibers.

SUMMARY

Embodiments of the present invention aim to address the above mentioned drawbacks of the prior art, and to propose first a laying method which permits to lay great lengths of any kind of elongated element into a duct, with reduced risk of damaging the elongated element with unexpected undulations/tangling/buckling.

In this aim, a first aspect of the invention is a method for installing an elongated element into a duct, comprising the steps of:
  inserting the elongated element into the duct through a pressure chamber located at an entry of the duct, by applying a driving force to the elongated element, resulting in a effective pushing force $F_{2\mathit{eff}}$ downstream the pressure chamber,
  introducing pressurized fluid into the duct at a nominal pressure, through the pressure chamber,
wherein, after an instant when the elongated element has entered the duct and before an instant when the elongated element reaches a final position into the duct, the method comprises the steps of:
  monitoring at least fluid pressure into the duct and the driving force,
  reducing the fluid pressure to a predetermined value lower than the nominal pressure, in relation to the driving force.

The above method comprises a step of measuring and monitoring the fluid pressure and driving force, so that the fluid pressure might be reduced at a lower value than the nominal pressure, to avoid having laying conditions leading to the unexpected stop leading to a possible damage of the elongated element as undulations or tangling might occur when a stop is not expected. Indeed, despite increasing the fluid pressure when velocity decreases might be first reaction, it is not the correct counter measure if the pressure force applied to the elongated element at the entry of the pressure chamber approaches or exceeds the measured driving force. In that specific case, the correct countermeasure is to lower down the pressure inside the pressure chamber to make sure that the balance of the driving force and the pressure force is in favor of an entry into the pressure chamber. One should note that the final position is understood or meant as being the desired position of the elongated element, at the end of the process, and not the one if the elongated element is blocked before its front end exits the duct for example.

The monitoring of the fluid pressure into the duct is done near the pressure chamber, in the vicinity of the introduction of the elongated element into the duct, i.e. close to the floating/jetting equipment. Typically, there is a pressure sensor installed to measure the pressure present into the pressure chamber, and/or within the first meters of the duct.

The driving force is typically created by a driving unit with rollers or caterpillars clamping the elongated element.

Advantageously, the driving force and/or driving speed of driving means applying the driving force is decreased or reduced if buckling or deviation from a nominal trajectory of the elongated element is detected. This measure limits the risks of damaging the elongated element.

In a first embodiment, the driving three ($F_a$) is applied upstream an entry of the elongated element into the pressure chamber so as to push the elongated element into the pressure chamber with a external pushing force, and wherein the fluid pressure is reduced if the fluid pressure results in an axial outward pressure force applied to the elongated element susceptible to be equal or greater than the external pushing force.

In such case, the external pushing force is equal to the driving force subtracted with a force to pull the cable from the reel.

In other words, the driving force $F_a$ is the sum of:
  an external pushing force $F_2$ applied downstream the driving unit, to force entry of the elongated element into the pressure chamber, and
  a pulling force $F_1$ applied upstream the driving unit, to unreel/uncoil the elongated element from a reel or coil.

It is particularly advantageous to measure the fluid pressure at the entry of the duct, or in the pressure chamber. This is close to the equipment and gives an accurate calculation of the pressure force $F_1$ applied to the elongated element which is directed/oriented opposite to the pushing force $F_2$, effectively available from the applied driving force $F_a$ by the driving unit. Therefore, decision to lower the fluid pressure is effectively taken when the pressure three tends to be equal to or even greater than the driving force applied to the elongated element upstream to the pressure chamber.

Advantageously, the fluid pressure is reduced if:

$$F_{2eff} \leq 0$$

where: $F_{2eff} = F_2 - F_i$

Typically the nominal fluid pressure is (well) below the maximum pressure that the duct can withstand without any damage (plastic deformation or burst).

Advantageously, fluid pressure is reduced if the fluid pressure results in an axial outward pressure force applied to the elongated element susceptible to be equal or greater than the external pushing force. Indeed, despite increasing the fluid pressure when velocity decreases might be first reaction, it is not the correct counter measure if the pressure force applied to the elongated element approaches or exceeds the measured external pushing force (as increasing the fluid pressure will result in a further disadvantageous balance of pushing force vs pressure force). In that specific case, the correct countermeasure is to lower down the pressure inside the pressure chamber.

In a second embodiment, the driving force is applied downstream an entry of the elongated element into the pressure chamber so as to pull the elongated element into the pressure chamber with an effective pulling force ($F_{1eff}$), and wherein the fluid pressure is reduced if the fluid pressure results in an axial outward pressure force applied to the elongated element susceptible to be equal or greater than the driving three subtracted with a force to pull the cable from the reel.

In this case, the effective pulling force is equal to the sum of the pressure force and a force to pull the cable from the reel.

Now, related to the two above embodiments, advantageously, more particularly in the case of jetting, fluid pressure is reduced if:

$$\frac{F_{2eff}}{F_{bc}} \leq 0.2;$$

where:

$$F_{2eff} = F_a - F_1 - F_i;$$
$$F_i = \frac{\pi}{4} D_c^2 p_d;$$
$$F_{bc} = \frac{\pi}{4} D_c D_d p_d;$$

$F_a$: applied and measured driving force;
$F_1$: applied and measured force to pull the elongated element from reel;
$D_c$: elongated element diameter;
$D_d$: Duct internal diameter;
$p_d$: fluid pressure.

The fluid pressure is reduced as soon as the calculated ratio tends to be lower or equal to 0.2, meaning that the effective force (pushing or pulling) applied to the elongated element by the driving means tends to be not sufficiently larger than the pressure force applied by the pressure to the elongated element at the pressure chamber entry.

More advantageously, in the case of jetting and still related to the two above embodiments, fluid pressure is reduced if:

$$\frac{F_{2eff}}{F_{bc}} \leq 0.1;$$

where:

$$F_{2eff} = F_a - F_1 - F_i;$$
$$F_i = \frac{\pi}{4} D_c^2 p_d;$$
$$F_{bc} = \frac{\pi}{4} D_c D_d p_d;$$

$F_a$: applied and measured driving force;
$F_1$: applied and measured force to pull the elongated element from reel;
$D_c$: elongated element diameter;
$D_d$: Duct internal diameter;
$p_d$: fluid pressure.

The fluid pressure is reduced as soon as the calculated ratio tends to be lower or equal to 0.1, meaning that the effective force (pushing or pulling) applied to the elongated element by the driving means tends to be not sufficiently larger than the pressure force applied by the pressure to the elongated element at the pressure chamber entry to fully and optimally benefit from the synergy between pushing and blowing.

Advantageously, the method comprises a step of:
uncoiling the elongated element from a reel before pushing the elongated element into the duct;
measuring a pulling force applied to the elongated element to uncoil the elongated element;
correcting the driving force by the measured pulling force to decide if fluid pressure shall be reduced. According to this embodiment, the effective pushing force (the force necessary to overcome the pressure force) is estimated, even if an effort is necessary to uncoil the elongated element.

Advantageously, the step of measuring the pulling force comprises a step of measuring a transverse force applied to the elongated element following a specific path, between the reel and driving means arranged to apply the driving force. The step is easy to implement, with the measurement of a transverse force of the elongated element at a predetermined angle between the reel and the driving unit.

Advantageously, the fluid is gas. Consequently, the pressure chamber might be referred as a blowing chamber.

Advantageously, elongated element velocity ($v_e$) is monitored, and the gas pressure is reduced if the elongated element velocity is lower than a predetermined speed, and/or if an undulation/deviation from a taut position of the elongated element in the duct is detected.

Advantageously, the step of reducing the gas pressure is followed by a step of increasing the gas pressure in relation to the driving force and/or elongated element velocity. The method of increasing the pressure back to the nominal pressure or similar level helps to recover a movement of the elongated element if a severe slow down is detected, or even if a stop occurs. In detail, increasing again the pressure after a decrease (with an optional step of venting) creates a temporary change in the pressure conditions along the duct, starting from a state at the reduced pressure (even at atmospheric pressure if complete venting is previously done) ending into a stabilized feed state at the nominal pressure, but passing through a state where the pressure decrease along the duct's length is close to a linear pressure decrease.

The applicant found that this linear pressure decrease along the duds length was creating better conditions for the laying of the elongated element as the drag force is quite uniform along the entire length of the elongated element. This "constant" drag force might help to recover a normal position of the elongated element (i.e. no tangling, no undulations in the duct), for normal further processing of the jetting process.

For example, the decrease of pressure is decided when the elongated element velocity slows down, indicating for example that the gas propelling forces acting on the elongated element in a first section of the duct are not sufficient to overcome the friction forces between the elongated element and the duct, and that the cumulated excess gas propelling forces acting on the elongated element further in the duct which effectively reach the first section (backwards through the elongated element, partly consumed by the capstan effect) are not assisting enough to still overcome the friction forces. The temporary linear pressure decrease (during the step of pressure increase at the pressure chamber) along the duct's length helps to increase the gas propelling threes acting on the elongated element over the entire first section such that the friction forces are compensated there.

For example, the decrease of pressure is decided when the elongated element velocity slows down, or when the elongated element position in the duct deviates from a nominal position, indicating for example the distal end of the elongated element is meeting a duct bend, or junction, creating increased friction or even a stop between the duct and the elongated element at this specific location. The temporary linear pressure decrease (during the step of pressure increase at the pressure chamber) along the duct's length, or a temporary increased pressure gradient at the location of the distal end of the elongated element, helps to pass this specific location and to recover at least a movement of the front end of the elongated element and/or "normal" laying conditions.

Recovery of the movement is especially effective when the distal end of the elongated element is at a location where the temporary pressure profile has a larger pressure gradient than for the stationary situation at that location. In particular, the method is helpful when the elongated element has been installed or laid over about less than two thirds of the duct's length.

Advantageously, if an abrupt increase of gas pressure from atmospheric pressure up to the nominal pressure is applied to the unpressurized duct, a constant decrease of pressure per meter along the duct is reached at a given time $t_c$; and the the increase of gas pressure of above mentioned embodiment is done at a rate so that the nominal pressure is reached at a time $t_M$ comprised in the range: $0.15 t_c \leq t_M \leq 0.5 t_c$. The applicant found very advantageous to avoid an abrupt increase of pressure, typically met with a sudden valve opening, and rather to apply this controlled ramp up for the pressure increase, as brutal or abrupt recovery to nominal pressure might create tangling of the elongated element in the duct (the abrupt pressure increase has the effect to "push" any slack portion or free length of the elongated element, the free length being accumulated at limited position and then thrilling a tangle). A constant decrease of pressure is understood as the gradient of pressure per meter is within a range of ±50% of average pressure gradient, and more particularly ±30% of average pressure gradient along duct's length.

Advantageously, the steps of reducing the gas pressure and increasing the pressure are repeated several times before the instant when the elongated element reaches the final position into the duct.

Advantageously, if several sequences of pressure decrease and pressure increase are performed. The last sequence is performed so that the pressure increase ends to supply gas at a nominal pressure greater than the nominal pressure achieved by, the previous sequences and lower than a nominal pressure creating a pressure force equal or greater than:
  the external pushing force if the driving force is applied upstream the entry of the elongated element into the pressure chamber,
  the driving force subtracted with the force to pull the cable from the reel if the driving force is applied downstream the entry of the elongated element into the pressure chamber. The Applicant found it advantageous to gradually increase the final gas pressure of the increase of pressure step, to benefit at the maximum from the recovery of movement.

Advantageously, the step of reducing the gas pressure comprises a step of venting the gas pressure by opening an orifice at the entry of the duct. This embodiment helps to start from atmospheric pressure to get the temporary linear pressure decrease along the duct's length during the further increase of pressure.

A second aspect of the invention relates to an apparatus for installing a elongated element into a duct, comprising:
  a pressure chamber connected to an entry of the duct, and arranged to be pressurized at a nominal fluid pressure,
  a driving unit arranged to apply a driving force to the elongated element to insert the elongated element into the duct, through the pressure chamber,
  a monitoring unit, arranged for monitoring at least the fluid pressure and the driving force and/or elongated element velocity,
  a control unit arranged to automatically reduce the fluid pressure in relation to said the driving force and/or elongated element velocity.

A third aspect of the invention relates to an apparatus for jetting a elongated element into a duct, comprising:
  a blowing chamber connected to an entry of the duct, and arranged to be pressurized at a nominal gas pressure,
  a driving unit arranged to apply a driving force to the elongated element to insert the elongated element into the duct, through the blowing chamber,
  a monitoring unit, arranged for monitoring at least the gas pressure and the driving force and/or elongated element velocity,
  a control unit arranged to automatically reduce the gas pressure in relation to the driving force and/or elongated element velocity.

Advantageously, the apparatus comprises:
  an unreeling unit, arranged to unreel the elongated element from a reel, and to supply the elongated element to the pushing unit at a predetermined angle,
  a transverse force measuring unit, arranged between the unreeling unit and the driving unit, to measure a transverse force and/or an axial force being a pulling force applied to the elongated element to unreel the elongated element.

According to an embodiment, the apparatus comprises an entry into the pressure chamber for the elongated element, and the driving unit is arranged upstream the entry (along the elongated element trajectory).

According to another embodiment, the apparatus comprises an entry into the pressure chamber for the elongated element, and the driving unit is arranged downstream the entry (along the elongated element trajectory).

BRIEF DESCRIPTION OF THE DRAWINGS

Other features and advantages of the present invention will appear more clearly from the following detailed description of particular non-limitative examples of the invention, illustrated by the appended drawings where.

DETAILED DESCRIPTION

In the present application, it is referred to elongated elements, which may be for example, cables, electric cables, optical fibers or cables, temperature sensing optic fibers or cables. All these elongated elements may comprise for example a core, a coating, or a sheath. However, the wording elongated element is not limited to any of these specific examples.

It is also referred to ducts, which may be for example pipes, hollow cylinders, tubes, conduits: anything defining a channel in which an elongated element may be laid in or out, from a first location to a second location.

Figure 1A:
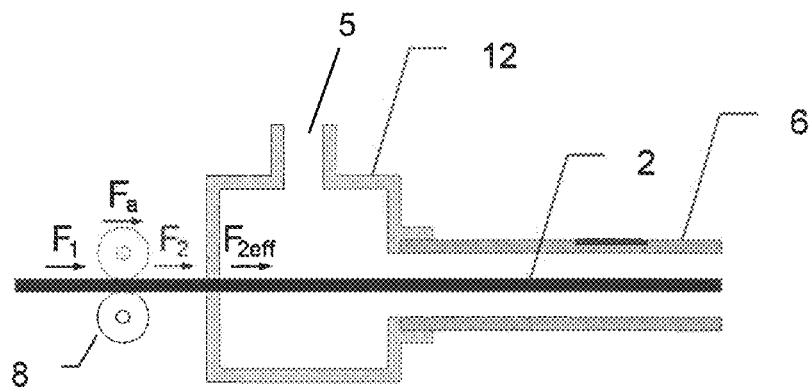
FIG. 1a represents a sketch of an apparatus according to a first embodiment of the invention.

FIG. 1a represents a sketch of an apparatus according to a first embodiment of the invention, to illustrate the forces involved during the laying of an elongated element (cable 2) into a duct 6, performed with a driving unit via a pressure chamber 12, when the driving unit is a pushing unit 8 arranged upstream the entry of the cable 2 into the pressure chamber 12.

The force from the reel is a pulling force, the three from the drive $F_a$ is a traction force, the external pushing force after the mechanical drive $F_2$ and the insertion force $F_i$ are pushing forces and the force $F_{2\mathit{eff}}$ is an effective pushing force. The following formulas apply:

$$F_a = F_1 + F_2$$

$$F_{2\mathit{eff}} = F_2 - F_i$$

Then:

$$F_{2\mathit{eff}} = F_a - F_1 - F_i$$

Example: Pulling force $F_1$ from reel 5 N, traction force $F_a$ from mechanical drive 10 N, pushing force after mechanical drive 5 N, insertion (pushing) force $F_i$ 1 N and effective pushing force $F_{2\mathit{eff}}$ 4 N.

Figure 1B:
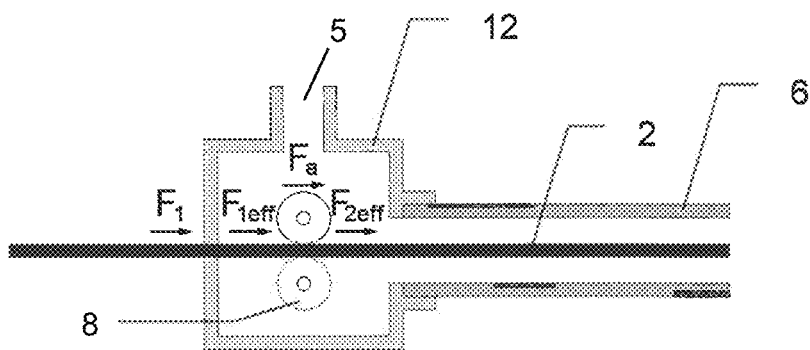
FIG. 1b represents a sketch of an apparatus according to a second embodiment of the invention.

FIG. 1b represents a sketch of an apparatus according to a second embodiment of the invention, to illustrate the forces involved during the laying of an elongated element (cable 2) into a duct 6, performed with a driving unit via a pressure chamber 12, when the driving unit is a pulling unit 8a arranged downstream the entry of the cable 2 into the pressure chamber 12.

The pulling force from the reel $F_1$, the insertion force $F_i$ and the force $F_{1\mathit{eff}}$ are pulling forces, the force from the drive $F_a$ is a traction force and the force after the mechanical drive $F_{2\mathit{eff}}$ is an effective pushing force. The following formulas apply:

$$F_a = F_{1\mathit{eff}} + F_{2\mathit{eff}}$$

$$F_{1\mathit{eff}} = F_1 + F_i \text{ (note the plus sign for } F_i\text{)}$$

Then:

$$F_{2\mathit{eff}} = F_a - F_1 - F_i$$

Example: Pulling force $F_1$ from reel 5 N, insertion (pulling) force $F_i$ 1 N, effective pulling force 6 N, traction force $F_a$ from mechanical drive 10 N and effective pushing force $F_{2\mathit{eff}}$ 4 N after mechanical drive. So, the final result is the same.

Figure 2:
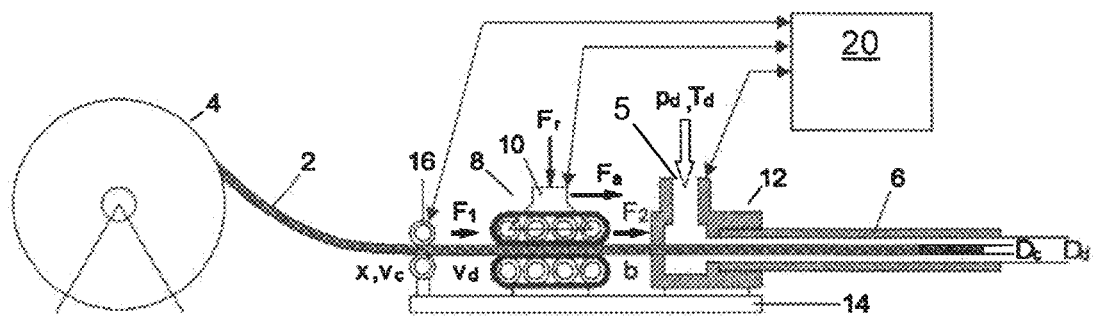
FIG. 2 is a detailed sketch of an apparatus according to the first embodiment of the invention, and arranged to carry out the method of the present invention.

FIG. 2 represents an apparatus arranged to lay an elongated element (a cable 2) into a duct 6, when the driving unit is a pushing unit 8. A cable 2 with diameter $D_c$ is installed from a reel 4 into a duct 6 with internal diameter $D_d$ using a device that simultaneously pushes and blows/floats the cable into the duct (in other words, this method is a jetting/floating method). Pushing is done with an axial force $F_a$ by a pushing unit 8, e.g. consisting of mechanically driven lower and upper belts, the latter belt pressed via block 10 onto the cable 2 with radial (pinch) force $F_r$.

The driving force $F_a$ is the sum of both the pulling force $F_1$ to pull the cable 2 from the reel 4 and the external pushing force $F_2$ to push the cable 2 into a pressure chamber 12 (which might be referred to as a blowing chamber as the fluid is gas in present example) and further into the duct 6. Fluid under pressure $P_d$ from a pump/compressor (not shown) is fed into the pressure chamber 12 via orifice 5, resulting in propelling forces exerted onto the cable 2 in the duct 6. The pressure chamber 12 is mounted on a common base plate 14 shared with the pushing unit 8. A wheel 16, also mounted on the base plate 14, follows the cable 2 to measure the distance x installed and, derived from that, the installation velocity $v_c$, The apparatus comprises a measure and control unit 20 connected to the pushing unit 8, the pressure chamber 12, and the idle wheel 16 to measure directly (as a function of time) the following parameters:

a) Motor pressure $p_m$ (pneumatic, hydraulic) or voltage or current (electric). Alternatively the driving force $F_a$ is measured on the pushing unit, using a strain gauge.

b) Cable radial (pinch) force $F_r$. This can be done by a calibrated spring (e.g., with maximum value of 100 N/cm for maximum settings and less, in steps (e.g. a ring indication on a bar sticking out), e.g. 100, 75, 50 and 25 N/cm. Many cables are specified for a crush resistance (between hard flat plates)>100 N/cm, but some smaller cables are specified <100 N/cm. In the latter case the pinch pressure may also need to be measured to guarantee (and prove) correct installation. Belt drives (usually soft and with cable groove) usually allow much larger pinch forces than the specified hard flat plate specification.

c) Fluid pressure $p_d$ in duct (pressure chamber).

d) Fluid temperature $T_d$ in duct (pressure chamber).

e) Cable position x. This is measured by an idle wheel 16 that is pressed (with low force) on the cable 2.

f) Cable velocity $v_c$. This comes from the same sensor as for e).

g) Belt velocity $v_d$. This is measured on the wheels which drive the belt.

Figure 3:
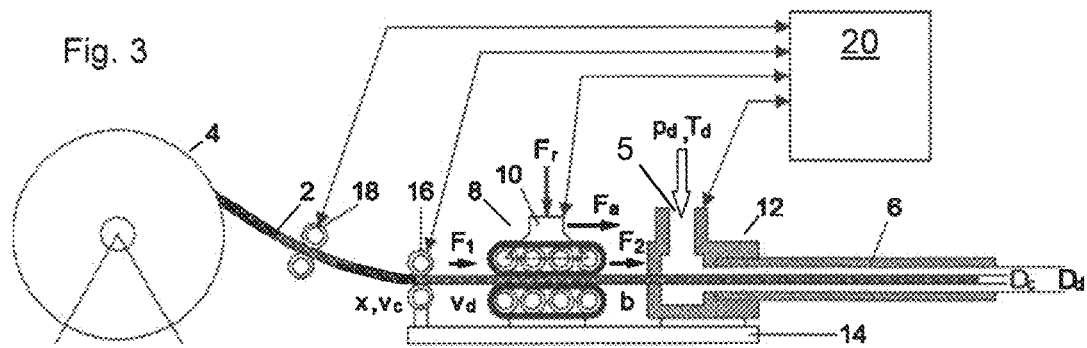
FIG. 3 represents the apparatus of FIG. 2, with an option to measure a transverse force during uncoiling an elongated element.

FIG. 3 shows the apparatus of FIG. 2, equipped with a transverse force measuring unit 18, arranged between the reel 4 and the pushing unit 8, to measure a transverse force so as to deduct an axial force being a pulling force applied to the cable 2 to unreel the cable 2.

The following parameters are relevant for the installation and are either parameters which are measured directly (see above), or calculated from the latter parameters:

1) Axial driving force $F_a$. This is obtained from the system that drives the belts or wheels, by e.g. pneumatic, hydraulic or electric motors, see a). Either the force of the drive system is measured directly (e.g. by a strain gauge) or derived from the torque of the motor. Often the torque of the motor depends on the speed of the motor. Therefore the axial force on the cable is corrected for the speed of the motor (belt), which is measured in g).

2) Cable radial (pinch) force $F_r$. This is directly measured by b).

3) Fluid pressure $p_d$ in duct (pressure chamber). This is directly measured by c).

4) Fluid temperature $T_d$ in duct (pressure chamber). This is directly measured by d).

5) Cable position x. This is directly measured by e).

6) Cable speed $v_c$. This is directly measured by f).

7) Slip: This uses the cable speed $v_c$, measured by f), and the belt velocity $v_d$, measured by g). The slip follows from the difference in both speeds.

From the above measured parameters, it is possible to calculate and predict when a critical situation can appear, leading to damage of the cable 2, or to a stop in the floating/jetting process. In particular, it is advantageous to make sure that the pushing unit applying a driving force $F_a$, resulting in a external pushing three $F_2$, and the pressure chamber 12 pressurized at $p_d$ are set to create an effective floating/jetting (for the latter effective synergy between pushing and blowing). In this aim, the Applicant found particularly advantageous to calculate the parameter $C_j$ as:

$$\frac{F_{2\mathit{eff}}}{F_{bc}} \equiv C_j,$$

where:

$$F_{2\mathit{eff}} = F_2 - F_i; \text{ or } F_{2\mathit{eff}} = F_a - F_1 - F_i$$

$$F_i = \frac{\pi}{4}D_c^2 p_d;$$

$$F_{bc} = \frac{\pi}{4}D_c D_d p_d;$$

$F_2$: external pushing force;
$F_a$: applied and measured driving force;
$F_1$: applied and measured force to pull the elongated element from reel;
$D_c$: elongated element diameter
$D_d$: Duct internal diameter;
$p_d$: gas pressure.

The Applicant found advantageous to have during the installing operation $C_j$ always greater than 0, and for jetting even greater than 0.2 and more preferably 0.1. Indeed, when $C_j$<0 the installing performance can be very bad. In the latter case the cable 2 will be under tensile load once inserted in the duct and the capstan effect is present from the start, killing the fluid drag trick of avoiding the capstan effect. In the case of jetting the effective pushing forces $F_{2\mathit{eff}}$ (after insertion in the duct) shall be also at least a fraction of the cumulative blowing forces, to create the synergy between pushing and blowing. When the external pushing force $F_2$ (and driving force $F_a$) is limited, the duct air pressure $p_d$ might be too large, and needs to be decreased for optimum performance with ($C_j$>0.1. In other words, when the factor $C_j$ becomes less than 0.1 the duct air pressure shall be decreased until the $C_j$ value of 0.1 is reached again, for optimal jetting. Jetting can then be performed as long as this condition is met ($C_j$ equal or above 0.1).

When the elongated element slows down or stops (if the velocity $v_c$ is measured below a minimum value, i.e. cable speed is zero or almost zero), the invention proposes to significantly decrease the gas pressure with complete venting of the duct and to increase again the gas pressure (as long as $C_j$ value allows this increase), to benefit from a specific and temporary state of gas flow in the duct 6, and to achieve again a movement of the elongated element.

Figure 4:
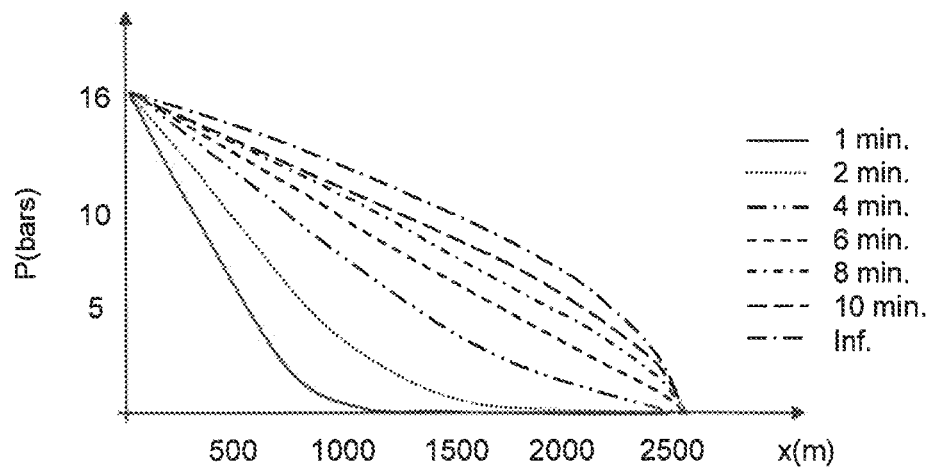
FIG. 4 represents pressure as a function of x in a duct for different time after opening a valve at 16 bar from zero pressure with a cable of a given external diameter and and the duct having a given internal diameter and a given length.

Indeed, as gas is a compressible medium, the pressure along the duct is not linear, and as shown FIG. 4, a sudden or abrupt increase of pressure in a duct, starting from a completely vented duct will create an evolution of the pressure profile along this duct. As visible FIG. 4, 1 minute after pressurization, the pressure decrease from 16 bars to atmospheric pressure from entry to approx. 1300 meters from entry. At 4 minutes, almost all the duct is pressurized, and after 10 minutes, the flow is established, with a small linear pressure decrease from entry to 1500 meters from entry, and a more and more important decrease as far the position is close to the exit.

The important curve to note is after 6 minutes, where the decrease of pressure looks like a linear decreasing function all along the total length of the duct. This means that at this specific time after start of pressurization, the drag force along the cable 2 will be quite uniform. This specific and temporary state of flow creates good conditions to jet or restart to jet the cable 2 a bit further in the duct 6.

Figure 5:
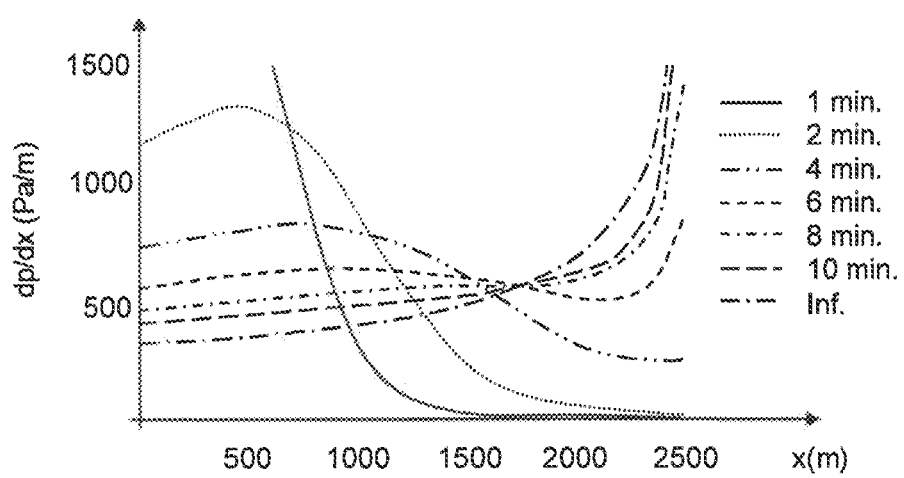
FIG. 5 represents the gradient of pressure as a function of x for the pressure curves shown on FIG. 4.

FIG. 5 shows the loss of pressure per meter all along the duct, at the same timings as the ones of FIG. 4. After 1 minute from pressurization, the gradient of pressure is very important at the entry of the duct (out of scale), and 10 minutes after pressurization, the gradient of pressure close to the exit is more than double than the one at the entry. Only after 6 minutes, the gradient of pressure varies less than ±30% of its average value, which is considered to be quite stable and constant. The specific state of flow at 6 minutes after pressurization creates a drag force along the entire length of the cable 2 which is quite uniform and this helps to move further the cable 2, or to recover a movement of the cable 2 after a stop. This time to get this specific and temporary "constant decrease of pressure" along the duct's length is called $t_c$, and depends from several parameters, and for example the duct internal diameter, the cable external diameter, the duct's length, the nominal pressure, the gas temperature. . . . The time $t_c$ is specific to each configuration, and can be calculated by means of simulation.

FIGS. 4 and 5 shows as well that an abrupt pressurization creates, immediately after opening of the valve, drag forces onto the portion of cable 2 located close to the pressure chamber (at 1 minute after pressurization, there is no pressure between 1500 and 2500 meters). Consequently, a great flow of compressed air is present only close to the entry of the duct, and if the pressurization is done while the cable 2 is almost laid, its portion close to the entry will be subjected to high flow, despite its portion at the end of the duct is not subjected to any drag/propelling force (as the air flow is still not established there). There might be a risk of tangling, if the cable 2 presents loose portion close to the entry (which is typically the case if jetting has been stopped because deviation or undulations have been detected), as all the loose portions will be pushed, ending in some cases in a tangle. This situation is likely to happen when a bundle of fibers are laid together, and one fiber of these fibers is stopped (blocked against a duct's connector for example).

The Applicant found very advantageous to avoid such abrupt and sudden increase of pressure while increasing again the pressure in the pressure chamber. In particular, when an abrupt increase of gas pressure up to the nominal pressure is applied to the unpressurized duct, the constant decrease of pressure per meter along the duct is reached at the given time $t_c$, and the increase of gas pressure to apply to minimize the risks of tangling should be done at a rate so that the nominal pressure is reached at a time $t_M$ comprised in the range: $0.15 t_c \leq t_M \leq 0.5 t_c$. In other words, it is found to set the pressure ramp up so that nominal pressure is recovered between 6 and 2 times faster than time $t_c$.

It is of course understood that obvious improvements and/or modifications for one skilled in the art may be implemented, still being under the scope of the invention as it is defined by the appended claims. In particular, it is referred to the laying of a cable, but the method is well suited to lay fibers, optical fibers, and especially fibers with low stiffness, as they present a high risk of damage if bended or pushed into the pressure chamber while undulations, buckling or a stop occur into the duct.

The invention claimed is:

1. A method for installing an elongated element into a duct, comprising the steps of:
    inserting the elongated element into the duct through a pressure chamber located at an entry of the duct, by applying a driving force ($F_a$) to the elongated element, resulting in an effective pushing force ($F_{2eff}$) downstream the pressure chamber,
    introducing pressurized fluid into the duct at a nominal pressure, through the pressure chamber, wherein, after an instant when said elongated element has entered the duct and before an instant when said elongated element reaches a final position into the duct, the method comprises the steps of:
    monitoring at least fluid pressure ($p_a$) into said duct and said driving force ($F_a$),
    reducing said fluid pressure ($p_d$) to a predetermined value lower than the nominal pressure, in relation to said driving force ($F_a$),
    wherein the driving force ($F_a$) is applied upstream an entry of the elongated element into the pressure chamber so as to push the elongated element into the pressure chamber with an external pushing force ($F_2$), and wherein the fluid pressure ($p_a$) is reduced if the fluid pressure ($p_d$) results in an axial outward pressure force applied to the elongated element susceptible to be equal or greater than the external pushing force ($F_2$).

2. A method according to claim 1, wherein the external pushing force ($F_2$) is equal to the driving force ($F_a$) subtracted with a force to pull the elongated element from a reel ($F_1$).

3. A method according to, claim 1 wherein fluid pressure ($p_d$) is reduced if:

$$\frac{F_{2eff}}{F_{bc}} \leq 0.1;$$

where:

$$F_{2eff} = F_a - F_1 - F_i;$$
$$F_i = \frac{\pi}{4} D_c^2 p_d;$$
$$F_{bc} = \frac{\pi}{4} D_c D_d p_d;$$

$F_a$: applied and measured driving force;
$F_1$ applied and measured force to pull the elongated element from a reel;
$F_{bc}$: applied and measured pressure force to the elongated element at the pressure chamber;
$D_c$: elongated element diameter;
$D_d$: Duct internal diameter;
$p_d$: fluid pressure.

4. A method according to, claim 1, comprising a step of:
    uncoiling the elongated element from a reel before pushing the elongated element into the duct;
    measuring a pulling force ($F_1$) applied to the elongated element to uncoil the elongated element;
    correcting the driving force ($F_a$) by the measured pulling force ($F_1$), to obtain the effective pushing force ($F_{2eff}$) and to decide if fluid pressure ($p_d$) shall be reduced.

5. A method according to claim 4, wherein the step of measuring the pulling force comprises a step of measuring a transverse force applied to the elongated element, between the reel and a driving means arranged to apply the driving force ($F_a$).

6. A method as claimed in claim 5, the driving means comprising a pushing unit, the pushing unit comprising upper and lower mechanically driven belts.

7. An apparatus as claimed in claim 6, the measure and control unit including one or more of a strain gauge, a calibrated spring, a fluid pressure gauge, a thermometer, or an idle wheel or drive wheel.

8. A method according to, claim 1, wherein the fluid is gas and the fluid pressure ($p_d$) is gas pressure.

9. A method according to claim 8, wherein elongated element velocity ($v_c$) is monitored, and wherein the gas pressure ($p_d$) is reduced if the elongated element velocity ($v_c$) is lower than a predetermined speed, and/or if an undulation/deviation from a taut position of the elongated element in the duct is detected.

10. A method according to claim 8, wherein the step of reducing the gas pressure ($p_d$) comprises a step of venting the gas pressure ($p_d$) by opening an orifice at the entry of the duct.

11. A method according to claim 8, wherein the step of reducing the gas pressure ($p_d$) is followed by a step of increasing the gas pressure ($p_d$) in relation to said driving force ($F_a$).

12. A method according to claim 11, wherein if an abrupt increase of the gas pressure ($p_d$) up to the nominal pressure is applied to the duct, a constant decrease of pressure per meter along said duct is reached at a given time $t_c$, and wherein the step of increasing the gas pressure ($p_d$) is done at a rate so that the nominal pressure is reached at a time $t_M$ comprised in the range: $0.15 t_c \leq t_M \leq 0.5 t_c$.

13. A method according to claim 11, wherein the steps of reducing the gas pressure ($p_d$) and increasing the gas pressure ($p_d$) are repeated several times before the instant when said elongated element reaches the final position into the duct.

14. A method according to claim 13, wherein if several sequences of pressure decrease and pressure increase are performed, the last sequence is performed so that the pressure increase ends to supply gas at a nominal pressure greater than the nominal pressure achieved by the previous sequences and lower than a nominal pressure creating a pressure force equal or greater than:
- the external pushing force ($F_2$) if the driving force ($F_a$) is applied upstream the entry of the elongated element into the pressure chamber,
- the driving force ($F_a$) subtracted with a force to pull the elongated element from a reel ($F_1$), if the driving force ($F_a$) is applied downstream of the entry of the elongated element into the pressure chamber.

15. A method for installing an elongated element into a duct, comprising the steps of:
- inserting the elongated element into the duct through a pressure chamber located at an entry of the duct, by applying a driving force ($F_a$) to the elongated element, resulting in an effective pushing force ($F_{2eff}$) downstream the pressure chamber,
- introducing pressurized fluid into the duct at a nominal pressure, through the pressure chamber, wherein, after an instant when said elongated element has entered the duct and before an instant when said elongated element reaches a final position into the duct, the method comprises the steps of:
  - monitoring at least fluid pressure ($p_d$) into said duct and said driving force ($F_a$)
  - reducing said fluid pressure ($p_d$) to a predetermined value lower than the nominal pressure, in relation to said driving force ($F_a$),
  wherein the driving force ($F_a$) is applied downstream an entry of the elongated element into the pressure chamber so as to pull the elongated element into the pressure chamber with an effective pulling force ($F_{1eff}$), and wherein the fluid pressure ($p_d$) is reduced if the fluid pressure ($p_d$) results in an axial outward pressure force ($F_i$) applied to the elongated element susceptible to be equal or greater than the driving force ($F_a$) subtracted with a force to pull the elongated element from a reel ($F_1$).

16. A method according to claim 15, wherein the effective pulling force ($F_{1eff}$) is equal to the sum of the pressure force ($F_i$) and a force to pull the elongated element from the reel ($F_1$).

17. An apparatus configured to implement the method for installing an elongated element into a duct as claimed in claim 15.

18. An apparatus for installing an elongated element into a duct, comprising:
- a pressure chamber connected to an entry of the duct, and arranged to be pressurized at a nominal pressure,
- a driving unit arranged to apply a driving force ($F_a$) to the elongated element upstream of an entry of the elongated element into the pressure chamber so as to push the elongated element through the pressure chamber and into the duct with an external pushing force ($F_2$),
- a monitoring unit, arranged for monitoring at least a fluid pressure ($p_d$) into the duct and the driving force ($F_a$),
- a control unit arranged to automatically reduce the fluid pressure ($p_d$) in relation to said driving force ($F_a$), wherein the fluid pressure ($p_d$) is reduced if the fluid pressure ($p_d$) results in an axial outward pressure force applied to the elongated element susceptible to be equal or greater than the external pushing force ($F_2$).

19. An apparatus according to claim 18, further comprising:
- a reel arranged to supply the elongated element to the driving unit at a predetermined angle,
- a transverse force measuring unit, arranged between the unreeling unit and the pushing unit, to measure a transverse force and/or an axial force being a pulling force applied to the elongated element to unreel the elongated element.

20. An apparatus according to claim 18, wherein the monitoring unit is arranged for monitoring an elongated element velocity ($v_c$),
and wherein the control unit is arranged to automatically reduce the duct pressure in relation to said elongated element velocity ($v_c$).

21. An apparatus as claimed in claim 18, the driving unit comprising upper and lower mechanically driven belts.

22. An apparatus as claimed in claim 18, the monitoring unit comprising a measure and control unit for measuring one or more of motor pressure, cable radial force, fluid pressure, fluid temperature, cable position, cable velocity, or belt velocity.

* * * * *